United States Patent
Cope et al.

(10) Patent No.: US 7,099,454 B1
(45) Date of Patent: Aug. 29, 2006

(54) CALLER IDENTIFICATION IN A COMMUNICATION SYSTEM

(75) Inventors: Warren B. Cope, Olathe, KS (US); Daniel Charles Sbisa, Blue Springs, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 850 days.

(21) Appl. No.: 10/277,377

(22) Filed: Oct. 22, 2002

(51) Int. Cl.
*H04M 3/00* (2006.01)
*H04M 1/64* (2006.01)
*H04M 7/00* (2006.01)

(52) U.S. Cl. .................... 379/245; 379/88.19; 379/234

(58) Field of Classification Search ............ 379/88.19, 379/88.2, 88.21, 93.23, 118, 183, 207.15, 379/221.08, 234, 245
See application file for complete search history.

(56) References Cited

U.S. PATENT DOCUMENTS

| | | | |
|---|---|---|---|
| 5,418,844 A | 5/1995 | Morrisey et al. | |
| 5,448,633 A | 9/1995 | Jamaleddin | |
| 5,524,146 A | 6/1996 | Morrisey et al. | |
| 5,566,235 A | 10/1996 | Hetz | |
| 5,572,583 A | 11/1996 | Wheeler, Jr. et al. | |
| 5,590,187 A | 12/1996 | Greenspan | |
| 5,675,635 A | 10/1997 | Vos et al. | |
| 5,684,866 A | 11/1997 | Florindi et al. | |
| 5,694,463 A | 12/1997 | Christie et al. | |
| 5,751,800 A * | 5/1998 | Ardon ........................ | 379/134 |
| 5,793,853 A | 8/1998 | Sbisa | |
| 5,825,780 A | 10/1998 | Christie | |
| 5,828,740 A | 10/1998 | Khuc et al. | |
| 5,864,614 A | 1/1999 | Farris et al. | |
| 5,901,209 A * | 5/1999 | Tannenbaum et al. . | 379/142.09 |
| 5,920,562 A | 7/1999 | Christie et al. | |
| 5,923,745 A | 7/1999 | Hurd | |
| 5,926,538 A | 7/1999 | Deryugin et al. | |
| 5,933,486 A | 8/1999 | Norby et al. | |
| 5,949,869 A | 9/1999 | Sink et al. | |
| 5,987,118 A | 11/1999 | Dickerman et al. | |
| 5,993,486 A | 11/1999 | Tomatsu | |
| 6,075,855 A | 6/2000 | Christiansen et al. | |
| 6,097,803 A | 8/2000 | Sbisa | |
| 6,148,069 A | 11/2000 | Ekstrom et al. | |
| 6,215,864 B1 | 4/2001 | Goyal et al. | |
| 6,252,953 B1 * | 6/2001 | Gruchala et al. ...... | 379/207.01 |
| 6,262,992 B1 | 7/2001 | Nelson et al. | |
| 6,327,359 B1 * | 12/2001 | Kang et al. ............ | 379/221.08 |
| 6,385,310 B1 * | 5/2002 | Holiday, II ................. | 379/120 |
| 6,470,081 B1 | 10/2002 | Sbisa et al. | |

(Continued)

FOREIGN PATENT DOCUMENTS

DE 199 54 224 A 1 5/2001

(Continued)

OTHER PUBLICATIONS

Dehni, Tarek, et al., "Intelligent Networks and the HP OpenCall Technology," Aug. 1997 Hewlett-Packard Journal, Article 6, XP-002259853, pp. 1-14.

(Continued)

*Primary Examiner*—Bing Q. Bui (57) ABSTRACT

A communication system for providing caller identification services comprises a processing system configured to store a data structure having a plurality of codes associated with a plurality of caller numbers, and to translate one of the codes into one of the caller numbers using the data structure. The communication system further comprises a communication interface configured to receive a first call request for a call including the one code and transfer a second call request for the call including the one caller number.

20 Claims, 6 Drawing Sheets

U.S. PATENT DOCUMENTS

| | | |
|---|---|---|
| 6,529,504 B1 | 3/2003 | Sbisa |
| 6,567,659 B1 | 5/2003 | Sbisa |
| 6,574,319 B1 | 6/2003 | Latter et al. |
| 6,603,851 B1 | 8/2003 | Smith et al. |
| 6,611,590 B1 | 8/2003 | Lu et al. |
| 6,690,656 B1 | 2/2004 | Christie et al. |
| 2004/0032864 A1 | 2/2004 | Sbisa et al. |

FOREIGN PATENT DOCUMENTS

| | | |
|---|---|---|
| EP | 0 631 447 A2 | 12/1994 |
| EP | 0 901 297 A2 | 3/1999 |
| WO | WO 99/35859 | 7/1999 |
| WO | WO 00/42782 | 7/2000 |

OTHER PUBLICATIONS

Briere, Daniel, "Sprint plans sweeping Network Revisions," Network World, Sep. 20, 1993, Network World, Inc.

* cited by examiner

CALLER IDENTIFICATION IN A COMMUNICATION SYSTEM

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of telecommunications, and in particular to providing caller identification.

2. Description of the Prior Art

Telemarketing companies solicit business for their clients by placing large numbers of telephone calls to prospective customers. Generally, telemarketing firms are staffed with several telemarketing operators that have several telephone connections to a telephone network. These telephone connections are typically over Integrated Digital Services Network (ISDN) lines or Dedicated Access Lines (DALs). The telemarketing operators continually place telephone calls to prospective customers on behalf of their telemarketing clients.

Caller ID is a telephone service that provides a caller's telephone number to a called party during call set-up. The called party may view the caller's number when deciding whether to answer the call. The called party may also block calls from particular caller numbers.

Recently, government entities have required telemarketing firms to identify their clients when placing telemarketing calls. The telemarketing operators must now specify a caller number that is associated with the client who is responsible for the call. With multiple clients, there are now multiple caller numbers for the telemarketing operators to manage in order to specify the correct caller number on a per call basis. Although ISDN lines allow telemarketing operators to specify caller numbers on a per call basis, ISDN lines are also more expensive than DALs. Unfortunately, DALs do not currently allow the telemarketing operators to specify caller numbers on a per call basis.

SUMMARY OF THE INVENTION

The invention helps solve the above problems with caller identification in a communication system. Advantageously, the invention allows a caller to specify caller numbers on a per call basis. If desired, the invention may allow telemarketing firms to identify their clients when placing telemarketing calls over DALs.

Examples of the invention include methods of communication system operation, communication systems, and software products for communication systems. The software products include software that directs communication system operation and a storage system that stores the software.

Some examples of the invention include a communication system comprising a processing system configured to store a data structure having a plurality of codes associated with a plurality of caller numbers, and translate one of the codes into one of the caller numbers using the data structure. The communication system further comprises a communication interface configured to receive a first call request for a call including the one code and transfer a second call request for the call including the one caller number.

In some examples of the invention, the communication interface is configured to receive the first call request over a DAL.

In some examples of the invention, the first call request comprises the one code appended to a called number.

In some examples of the invention, the processing system comprises a service control point.

In some examples of the invention, the processing system comprises a call center remote processor.

In some examples of the invention, the first call request comprises a service control point query.

In some examples of the invention, the second call request comprises a service control point response.

In some examples of the invention, the first call request comprises a remote processor query.

In some examples of the invention, the second call request comprises a remote processor response.

BRIEF DESCRIPTION OF THE DRAWINGS

The same reference number represents the same element on all drawings.

DETAILED DESCRIPTION OF THE PREFERRED EMBODIMENT

FIGS. 1–6 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
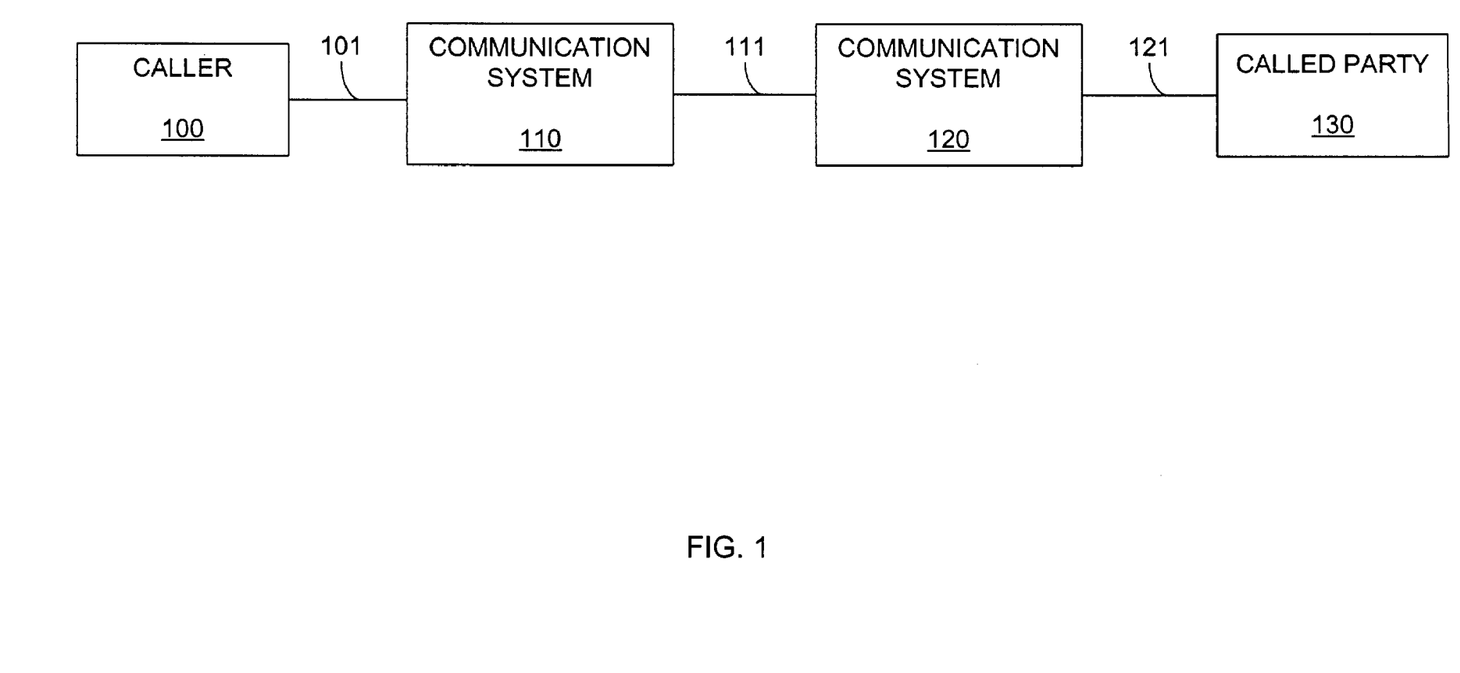
FIG. 1 illustrates a communication system in an example of the invention.
Figure 2:
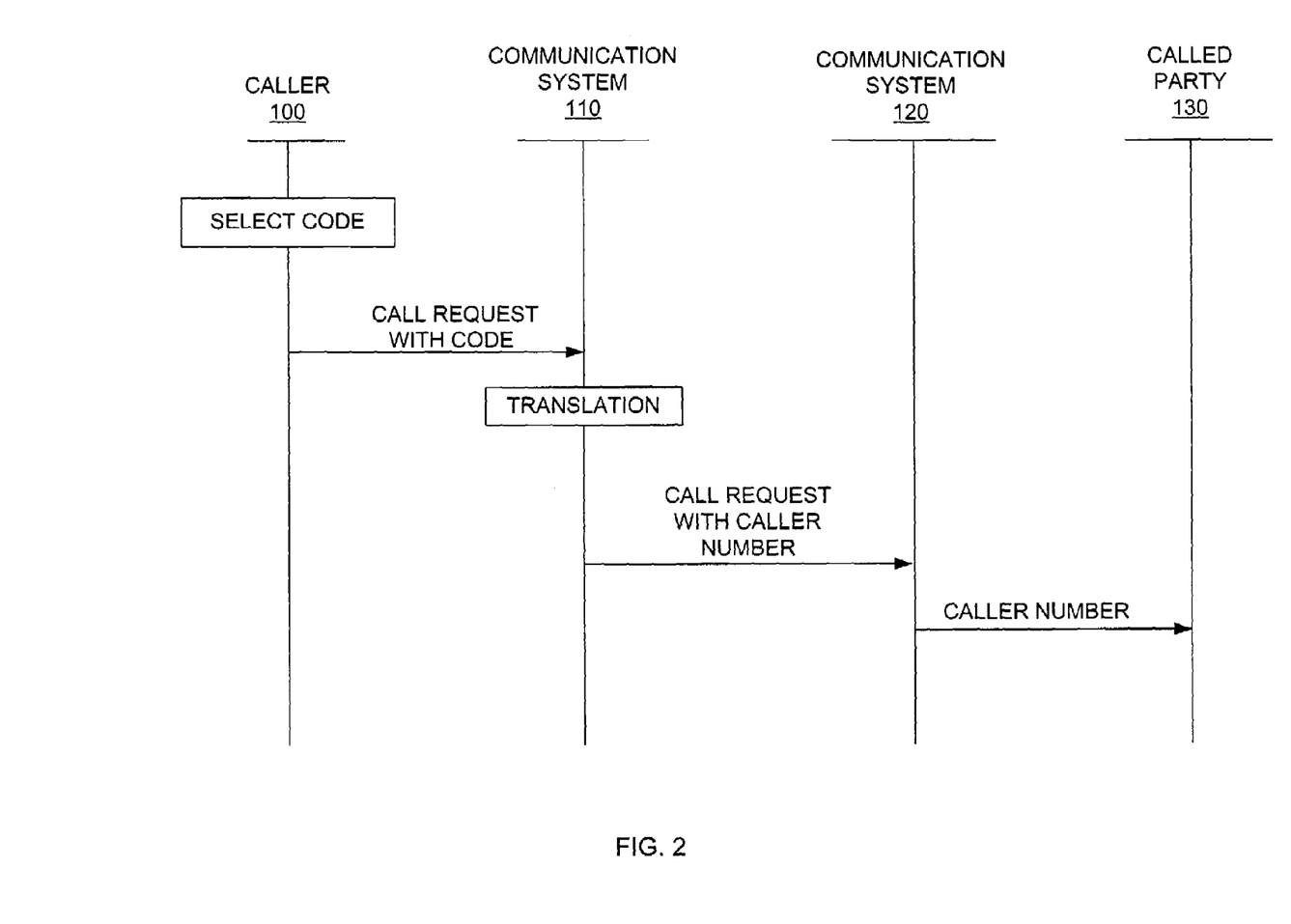
FIG. 2 illustrates operation of the communication system in an example of the invention.

Communication System Configuration and Operation—FIGS. 1–2

FIG. 1 illustrates communication system 110 in an example of the invention. Caller 100 is linked to communication system 110 by connection 101. In turn, communication system 110 is linked to communication system 120 by connection 111. Communication system 120 is linked to called party 130 by connection 121. Connections 101, 111, 121 could be conventional. In some examples connection 101 is a Dedicated Access Line (DAL). Communication system 120 and called party 130 could be conventional. Called party 130 could also be a billing system.

Communication system 110 includes a data structure that associates codes with caller numbers. Communication system 110 could be the Public Switched Telephone Network (PSTN) and could include a switch, Service Control Point (SCP), and/or a Remote Processor (RP) that stores the data structure. Communication system 110 uses the data structure to translate individual codes into individual caller numbers. Caller 100 is capable of transferring call requests having these codes to communication system 110.

FIG. 2 illustrates the operation of communication system 110 in an example of the invention. Caller 100 selects a code. Caller 100 sends a call request including the code to communication system 110. Communication system 110 translates the code into a caller number. Communication system 110 then sends a call request including the caller number to communication system 120. Communication system 120 sends the caller number to called party 130 during call setup. The call requests typically include a called number for called party 130.

Figure 3:
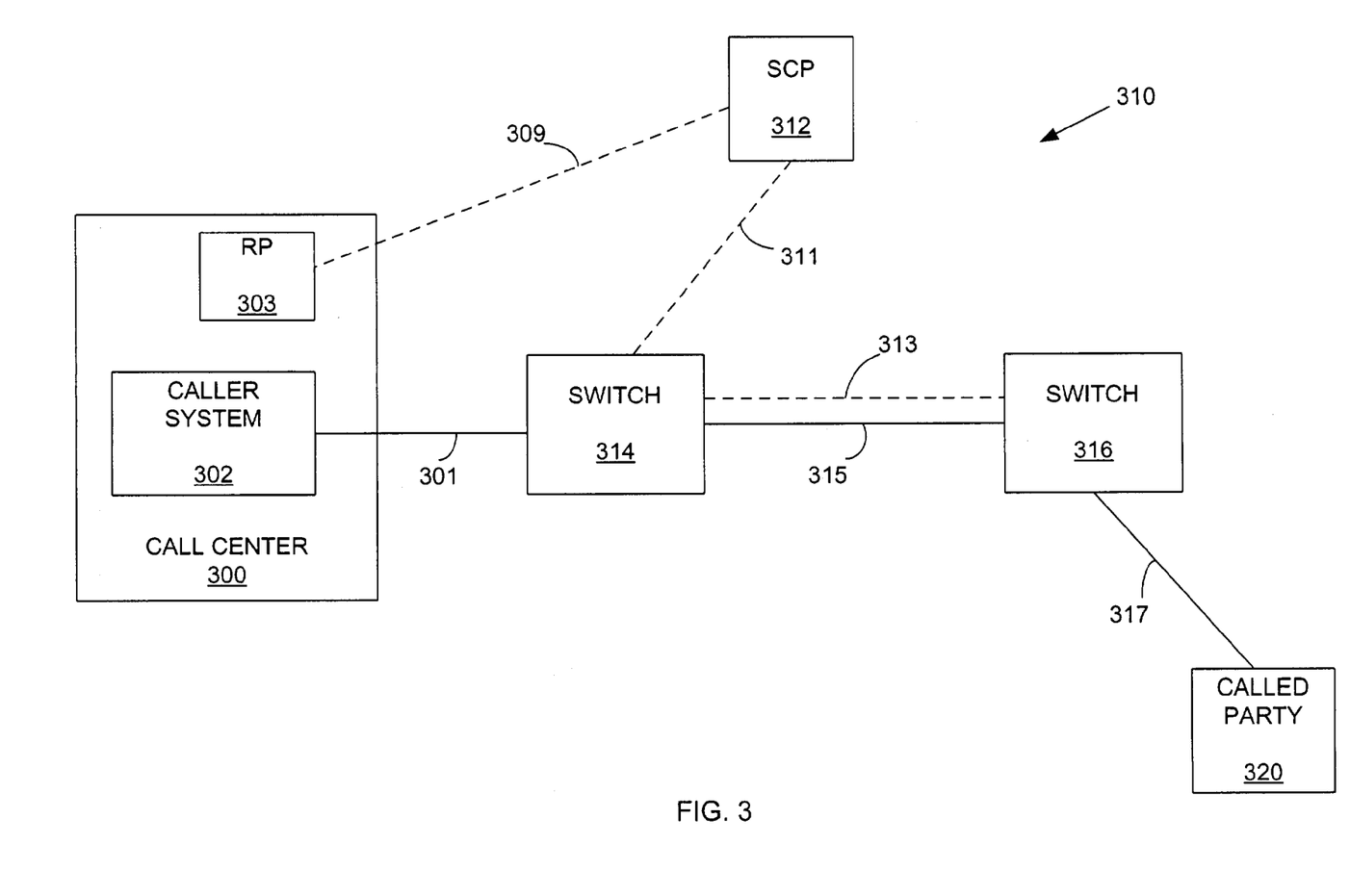
FIG. 3 illustrates a telecommunication network in an example of the invention.
Figure 4:
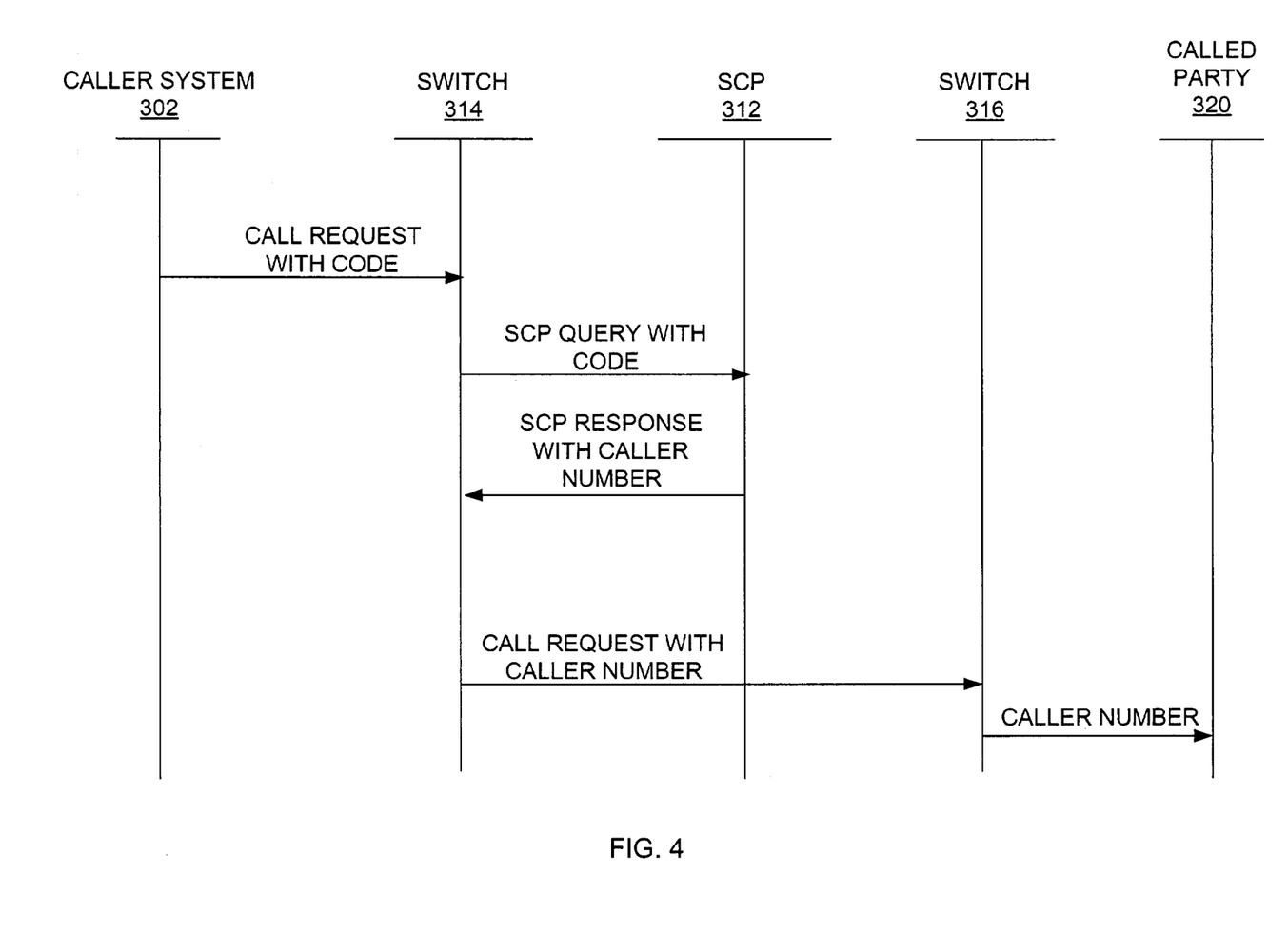
FIG. 4 illustrates operation of the telecommunication network in an example of the invention.
Figure 5:
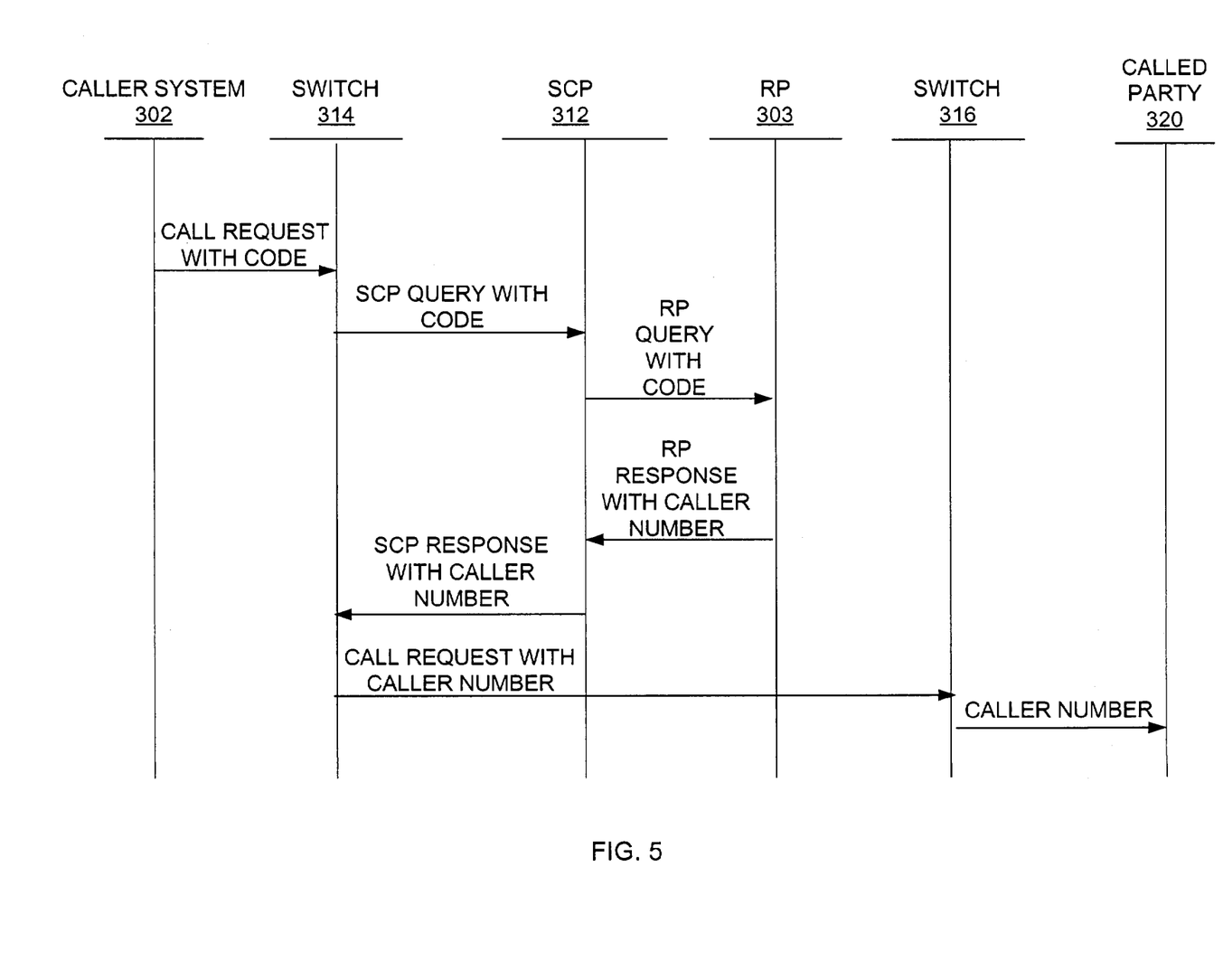
FIG. 5 illustrates operation of the telecommunication network in an example of the invention.

Telecommunication Network Configuration and Operation—FIGS. 3–5

FIG. 3 illustrates telecommunication network 310 in an example of the invention. Telecommunications network 310 comprises switch 314, switch 316, and SCP 312. Telecommunications network 310 is connected to call center 300 and called party 320. Call center 300 comprises caller system 302 and RP 303. Caller system 302 is connected to switch 314 by connection 301 comprising a DAL. Switch 314 is connected to SCP 312 by connection 311. SCP 312 is connected to RP 303 by connection 309. Switch 314 is connected to switch 316 by connection 313 and connection 315. Switch 316 is connected to called party 320 by connection 317. In the following examples, a data structure is used to translate codes into caller numbers. The data structure associates codes with caller numbers. The data structure could be stored in SCP 312, RP 303, switch 314, or in other telecommunication devices.

FIG. 4 illustrates operation of telecommunication network 310 in an example of the invention. In this example, the data structure is stored in SCP 312. A caller selects a code in caller system 302. Caller system 302 sends a call request for a call to switch 314. The call request comprises a called number appended by the code. Switch 314 receives the call request. In response to the call request, switch 314 sends an SCP query to SCP 312 including the code and the called number. SCP 312 receives the SCP query. In response to the SCP query, SCP 312 uses the data structure to translate the code into caller number. SCP 312 sends an SCP response having the caller number and called number to switch 314—and in some cases SCP 312 may also translate the called number. Switch 314 processes the SCP response to send a call request including the caller number and called number to switch 316. Switch 316 processes the call request to extend the call to the called party 320, including transferring the caller number to called party 320. If the called party answers the phone, telecommunications network 310 provides call connections between caller system 302 and called party 320 through switches 314 and 316 over connections 301, 315, and 317.

FIG. 5 also illustrates operation of telecommunications network 310 in an example of the invention. In this example, RP 303 stores the data structure. A caller selects a code in caller system 302. Caller system 302 sends a call request to switch 314. The call request comprises a called number appended by the code. Switch 314 receives the call request. In response to the call request, switch 314 sends an SCP query to SCP 312 including the code and called number. In response to the SCP query, SCP 312 sends an RP query to RP 303 including the code and called number. RP 303 receives the RP query. In response to the RP query, RP 303 uses the data structure to translate the code into a caller number. RP 303 sends an RP response having the caller number to SCP 312—and in some cases RP 303 may also translate the called number. SCP 312 sends an SCP response having the caller number and called number to switch 314. Switch 314 processes the SCP response and sends a call request including the caller number and called number to switch 316. Switch 316 receives the call request. Switch 316 then sends the caller number to the called party.

In another example of the invention, switch 214 stores the data structure. A caller selects a code in caller system 302. Caller system 302 sends a call request to switch 314. The call request comprises a called number appended by the code. Switch 314 receives the call request. In response to the call request, switch 314 uses the data structure to translate the code into a caller number. Switch 314 typically processes the called number to extend the call to switch 316. Switch 314 sends a call request including the caller number and called number to switch 316. Switch 316 receives the call request, and in response sends the caller number to called party 320.

Figure 6:
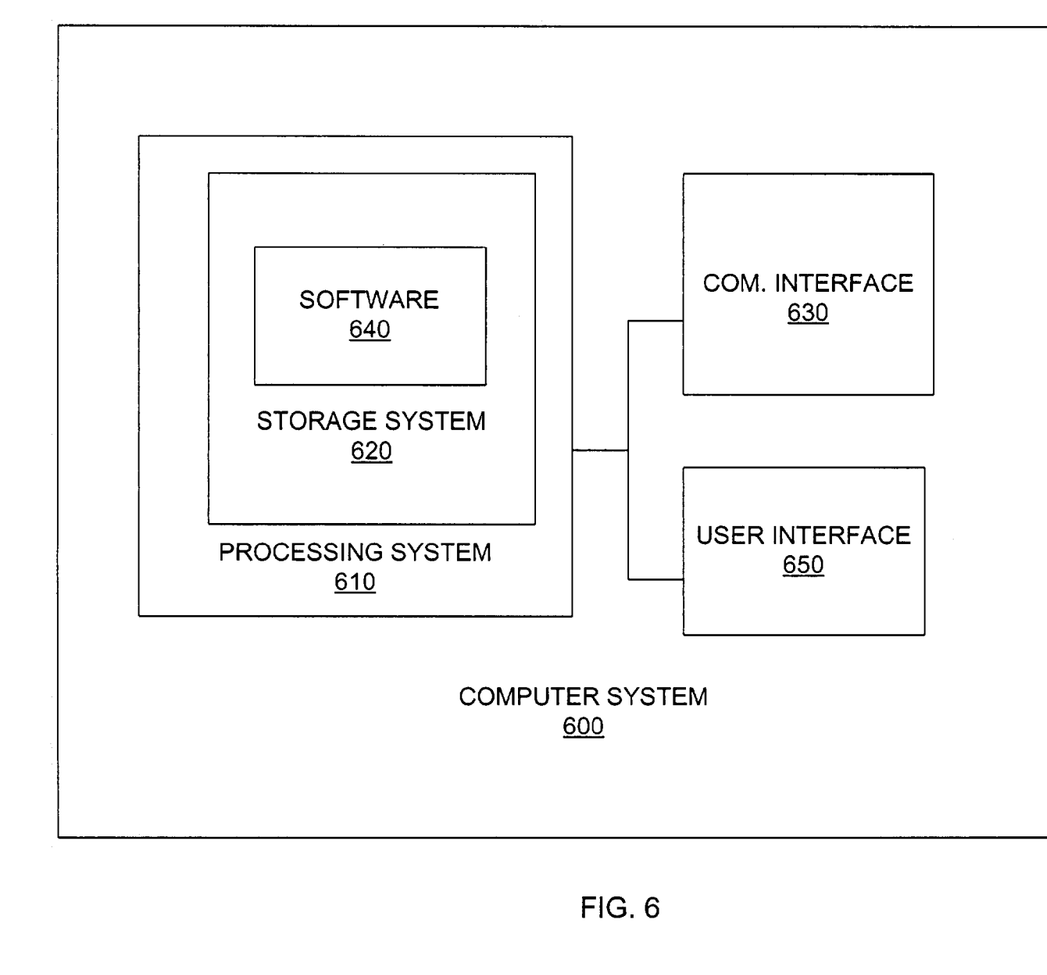
FIG. 6 illustrates a computer system in an example of the invention.

Computer System Configuration and Operation—FIG. 6

FIG. 6 illustrates computer system 600 that could be used to implement aspects of the invention. In particular, computer system 600 could be used in SCP 312, RP 303, switch 314, or an in another communication device. Computer system 600 includes communication interface 630, user interface 650, processing system 610, and storage system 620. Storage system 620 stores software 640. Processing system 610 is linked to communication interface 630, and user interface 650. Computer system 600 could be comprised of programmed general-purpose computers, although those skilled in the art will appreciate that programmable or special purpose circuitry and equipment may be used. Computer system 600 may use a client server architecture where operations are distributed among a server system and client devices that together comprise elements 610–650.

Communication interface 630 could comprise a network interface card, modem, port, or some other communication device. Communication interface 630 may be distributed among multiple communication devices. Processing system 610 could comprise a computer microprocessor, logic circuit, or some other processing device. Processing system 610 may be distributed among multiple processing devices. User interface 650 could comprise a keyboard, mouse, voice recognition interface, microphone and speakers, graphical display, touch screen, or some other type of user device. Storage system 620 could comprise a disk, tape, integrated circuit, server, or some other memory device. Storage system 620 may be distributed among multiple memory devices.

Processing system 610 retrieves and executes software 640 from storage system 620. Software 640 may comprise an operating system, utilities, drivers, networking software, and other software typically loaded onto a general-purpose computer. Software 640 could also comprise an application program, firmware, or some other form of machine-readable processing instructions. When executed by the processing system 610, software 640 directs the processing system 610 to operate as described for communications system 110 or telecommunications network 210.

Telemarketing Example of the Invention

In an example of the invention, a telemarketing operator places calls to called parties on behalf of multiple clients from a telemarketing call center. The operator selects a code that represents the client for that call. The operator places the call by transferring the code and called number over a DAL to a communication system. The code forms a 4 digit prefix to a 10 digit called number. The call is processed by a communication system that translates the 4 digit code into a 10 digit caller number for the client. The communication system sends the 10 digit caller number to the called party.

What is claimed is:

1. A method of operating a communication system to provide caller identification, the method comprising:
   storing in a data structure a plurality of codes in association with a plurality of caller numbers;
   receiving a first call request for a call including one of the codes;
   translating the one code into one of the caller numbers using the data structure; and
   transferring a second call request for the call including the one caller number.

2. The method of claim 1 wherein receiving the first call request comprises receiving the first call request over a dedicated access line.

3. The method of claim 1 wherein the first call request comprises the one code appended to a called number.

4. The method of claim 1 wherein translating the one code into the one caller number comprises using a service control point.

5. The method of claim 1 wherein the first call request comprises a service control point query.

6. The method of claim 1 wherein the second call request comprises a service control point response.

7. The method of claim 1 wherein translating the one code into the one caller number comprises using a remote processor.

8. The method of claim 1 wherein the first call request comprises a call center remote processor query.

9. The method of claim 1 wherein the second call request comprises a call center remote processor response.

10. A communication system for providing caller identification services, the communication system comprising:
    a processing system configured to store a data structure having a plurality of codes associated with a plurality of caller numbers, and translate one of the codes into one of the caller numbers using the data structure; and
    a communication interface configured to receive a first call request for a call including the one code and transfer a second call request for the call including the one caller number.

11. The system of claim 10 wherein the communication interface is configured to receive the first call request over a dedicated access line.

12. The system of claim 10 wherein the first call request comprises the one code appended to a called number.

13. The system of claim 10 wherein the processing system comprises a service control point.

14. The system of claim 10 wherein the processing system comprises a call center remote processor.

15. The system of claim 10 wherein the first call request comprises a service control point query.

16. The system of claim 10 wherein the second call request comprises a service control point response.

17. A software product for a communication system comprising:
    software configured to direct the communication system to store a plurality of codes associated with a plurality of caller numbers, and translate one of the codes from a first call request into one of the caller numbers for a second call request; and
    a storage system that stores the software.

18. The software product of claim 17 wherein the first call request comprises the one code appended to a called number.

19. The software product of claim 17 wherein the storage system comprises a service control point.

20. The software product of claim 17 wherein the storage system comprises a call center remote processor.

* * * * *